T. LAFITTE.
TRANSMISSION MECHANISM.
APPLICATION FILED FEB. 11, 1914.
1,227,456.
Patented May 22, 1917.
2 SHEETS—SHEET 1.
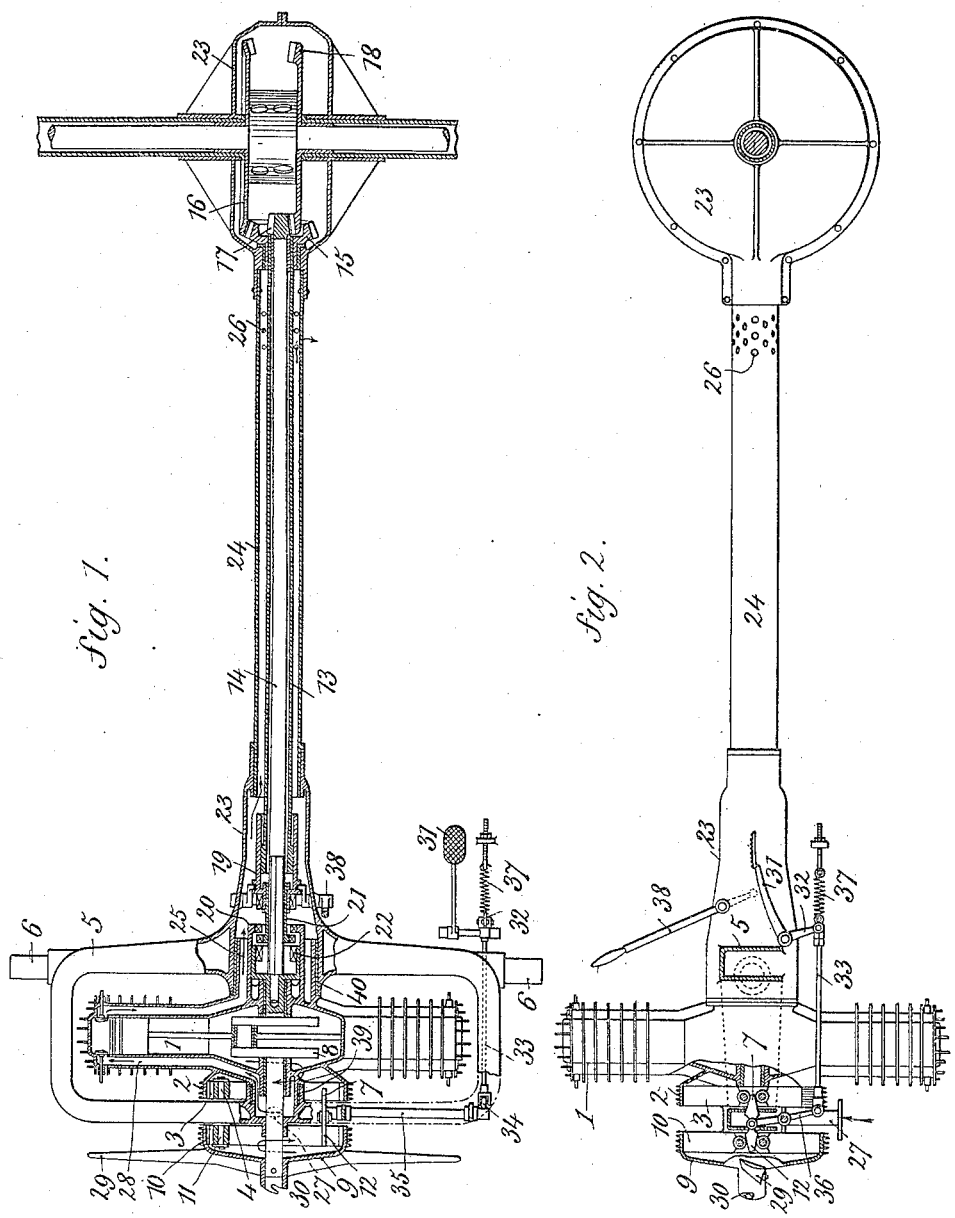
WITNESSES
INVENTOR
THÉODORE LAFITTE
BY
ATTORNEYS

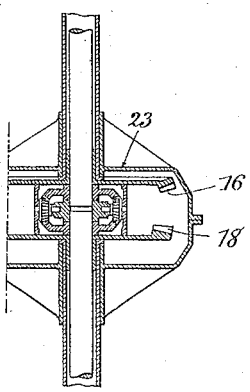
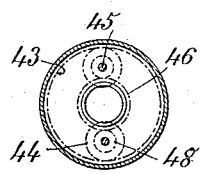
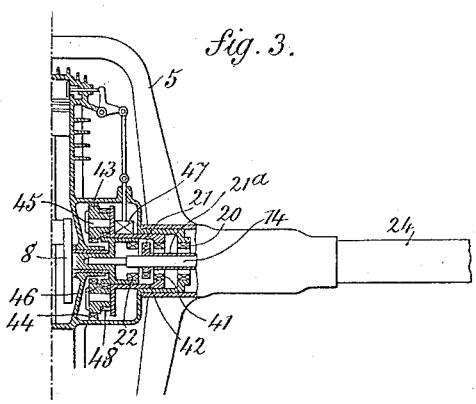
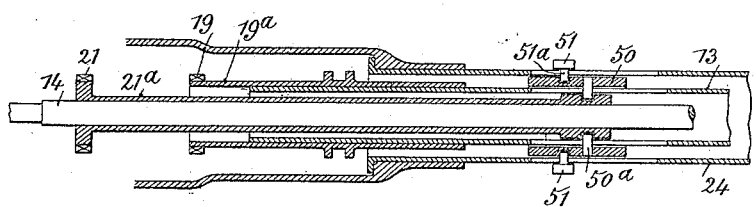

UNITED STATES PATENT OFFICE.

THÉODORE LAFITTE, OF PARIS, FRANCE.

TRANSMISSION MECHANISM.

1,227,456.   Specification of Letters Patent.   Patented May 22, 1917.

Application filed February 11, 1914. Serial No. 818,068.

*To all whom it may concern:*

Be it known that I, THÉODORE LAFITTE, a citizen of the Republic of France, residing at 6 Rue Gager-Gabillot, Paris, in the Republic of France, have invented certain new and useful Improvements in Transmission Mechanism, of which the following is a specification.

This invention has for its object to provide a transmission mechanism having several speeds and reversing motions, applicable in particular to automobile vehicles. Such device is essentially constituted by a motor of the rotary kind, the cylinders and the crank shaft of which, in the case of an explosion engine for instance, can be rendered stationary or movable, by means of two brakes or the like, the pulleys of which are fixed on the same. In the prolongation of the driving axis lie two shafts, concentric, in relation with two bevel pinions of an equal or different ratio, the large crowns of which are fixed on a differential, located on the transverse shaft controlling the wheels in the case of a vehicle. Through the medium of sleeves provided with jaws, the concentric shafts in the prolongation of the axis of the engine, and which carry the bevel pinions, can be connected with either the cylinders or the operating crank shaft. The combination by a suitable control of the two brakes and of the sleeves provided with jaws, allows for a constant speed of the engine and of driving the shaft of the driven wheels at several forward and backward speeds, by means of a clutch and a brake on the transmission gear.

The accompanying drawings, given only by way of illustration, will supply a clear comprehension of the arrangement and operation of the mechanism according to this invention, in which:—

Figure 1 is a plan view of the apparatus as a whole and as applied to an automobile vehicle.

Fig. 2 shows an elevation of the same apparatus as a whole.

Fig. 1ª is a detail sectional view of the differential.

Fig. 3 is a vertical section of a modification of moto-propeller system.

Fig. 3ª is a detail longitudinal section of the same, and

Fig. 4 is a transverse section of the box casing or box turning with the cylinders and carrying the gearing, the gearing being shown in dotted lines.

The driving cylinders 1 carry a brake pulley 2, the jaws 3 of which are carried by the axle 4, of a truss 5, carrying the driving mechanism mounted in bearings 39 and 40, such mechanism being hung by journals 6, 6 from the chassis of the vehicle. At 7 is shown the finger controlling the jaws 3. On the crank shaft 8 is also fixed a pulley 9, containing the jaws 10, secured by the axis 11 to the truss support 5, and of which the controlling finger is 12. Concentric to the prolongation of the axle of the crank shaft and centered in the truss 5 are two shafts 13 and 14, carrying bevel pinions 15 and 17 respectively meshing with bevel gear wheels 16 and 18. Such gears might be of the same ratio but we will assume that they are of a different ratio, yet suitable, as for instance $\frac{13}{16}$ greater than $\frac{17}{18}$. On the shafts 13 and 14 and slidable thereon are two sleeves provided with clutch teeth. The teeth of one 19 can gear with the clutch teeth 20 of the cylinders of the engine, and the teeth of the other 21 can gear either with the clutch teeth 20 of the cylinders or with the clutch teeth 22 of the crank shaft. The casing 23 which incloses the bevel gears and the differential 100 has a tube 24 which incloses the shafts 13 and 14 and is centered in the truss 5. Two channels 25 supply the exhaust gas of the engine to the tube 24. Holes 26, provided in the rear part of the tube 24, allow the escapement of the burnt gases to the atmosphere. The tube 24 serves both as a connecting means and as an exhaust conduit. The carbureter is secured at 27, in the fore part of the truss 5 and the gases are sucked in through conduits 28. To the crank shaft 8 is secured a fan 29 to turn therewith. A clutch tooth 30 allows of starting the engine by the usual means. The control properly so called, and which obviously may be of any other sort, is made, by way of example, by the following members:—

The treadle 31 operates through the medium of the parts 32, 33, 34, 35 and 36 the jaws 3 and 10 of the brakes 2 and 9. A suitable spring 37 restores the treadle 31 to such a position that the brake 9 on the crank shaft is so clamped as to stop the latter, and so that the brake 2 is free and allows the rotation of the cylinders 1. A lever 38 operates the sleeves provided with clutch teeth 19 and 21, which for instance can be moved in unison in the longitudinal direction, while remaining independent of one another for their rotations.

The rotations take place in the direction shown by the arrows, as follows:—

Firstly, in a clockwise direction for the crank;

Secondly, in a direction inverse to the clockwise one for the cylinders.

*Starting.*—The treadle 31 being held pushed to its extreme limit, the brake 2 on the cylinders 1 is set in motion; the latter are locked and the crank shaft is released; the start is made by the clutch tooth 30. The engine is in rotation.

*Running backward.*—In operating the lever 38, the clutch-teeth of the sleeve 21 are brought into gear with those of the sleeve 20 of the cylinders 1; then the treadle being released, the spring 37 restores the treadle 31 to its normal position. The crank shaft is gradually rendered stationary, while the released cylinders turn and drive the shaft 14 in a direction inverse to the clockwise one, which gives through the bevel gears 17—18 the backward running of the driving wheels. The clutch is released by pushing the treadle 31 to half its stroke; in this position both the brakes 2 and 9 are released and the crank shaft is permitted to turn. The braking is obtained by pushing the treadle to its extreme extent; the braking of the cylinders puts the cylinders in connection with the shaft 14 through the medium of the clutch 21 and acts to stop the vehicle.

*Forward running.*—(*a*) *First speed* (*a slow one.*)—At the same time that the treadle 31 is brought to half its stroke, to the unclutching position, the clutch-teeth of the sleeve 19, on the shaft 13 are brought, by the lever 38, into gear with the clutch-teeth 20 of the cylinders of the engine; the clutch-teeth of the sleeve 21, previously coupled with the clutch-teeth 22 of the crank shaft are held in mesh with the latter. Both the shafts 13 and 14 become driving shafts, and the cylinders and the crank shaft revolve in a direction inverse to a speed inversely proportional to the ratios of the corresponding bevel gearing. There is thus obtained the first speed in the forward running. The unclutching is obtained by putting the clutch-teeth of the sleeve 21 out of mesh or gear with those 22 of the crank shaft for instance. The braking operation is obtained by pushing the treadle 31 to its extreme extent; the brake on the cylinders acts.

(*b*) *Second speed* (*average one.*)—With the unclutching, and with the treadle 31 at one half of its stroke, by means of the lever 38, the clutch-teeth of the sleeve 21 of the shaft 14, are brought in gear with the clutch-teeth 22 of the crank shaft, then gradually full pressure is brought to bear on the treadle 31; the cylinders are rendered stationary and the crank shaft is revolving in a clockwise direction in carrying forward the beveled gearing corresponding to the shaft 14 in such a manner that the forward running in the ratio of the pinions 17 and 18 is obtained. The unclutching is obtained by allowing the treadle 31 to be restored to the middle part of its stroke. The braking operation is obtained by releasing completely the same, which, by means of the spring 37, puts in operation the brake on the crank shaft connected at this time, with the transmission gear. The engine continues its rotation as at such time the cylinders are free.

(*c*) *Third speed* (*high speed.*)—If in this last named position, one allows the treadle 31 to return to its normal position, by means of the spring 37, the crank shaft becomes stationary, the cylinders revolve in a direction inverse to the clockwise direction and transmit through the clutch-teeth 20 and 19 of the sleeve and the shaft 13, their motion to the bevel wheels 15—16, which gives the high speed of the forward running. The unclutching is done by pushing the treadle 31 to the middle of its stroke. The braking operation is brought about by pushing the same to its full stroke, thus causing the operation of the brake on the cylinders which are at this time in relation with the transmission gear. The engine continues its rotation since the crank shaft can revolve freely.

The cooling is obtained as follows:—

Firstly, at high speed, by the rotation of the cylinders;

Secondly, at average speed by the cylinders and of the fan 29;

Thirdly, at slow speed, by the rotation of the fan 29;

Fourthly, when running backward, by the rotation of the cylinders; and

Fifthly, when the engine is revolving idly, by the rotation of the cylinders.

The Carter box turning with the cylinders 1 and with the pulley brake 2 is provided with the inner teeth 43. The crank brake 8 carries outer gearing 46. Two pairs of satellites comprising each a pinion 44 gearing with 43 and a pinion 48 gearing with 46, are loosely mounted on the axes 45 carried by a satellite holder 42 the hub of which forms a hollow distribution shaft and is provided with claws 41 and with cams 47; the latter serve in a well known manner to actuate the distribution valves which is possible if the holder 42 turns at a speed two times less than the speed of the crank brake with respect to the cylinders.

One obtains this result by making the relation of the number of the teeth of the pinions 43 and 44 equal to the relation of the number of the teeth of the pinions 46 and 48.

The sleeve 19ª provided with claws 19 slides on the hollow shaft 13 and a sleeve 21ª provided with claws 21 slides on the central shaft 14. A ring 50 sliding on the shaft 13 has tenons 50ª sliding in the grooves of such shaft and engaged in a circular neck and displaced by means of a forked lever 51 having tenons 51ª which pass through the grooves of the covering 24 and which engage in the said circular groove of the ring 50. The claws 21 can thus be displaced from the outside without interfering with the shaft 13.

Owing to the employment of the planetary system 44, 48, 46 and the respective claws 41, one can obtain a greater number of relative speeds.

Firstly, the brakes 2 and 9 being separated, one obtains the running speeds different before (a) in coupling 13 with 20 and 21 with 22; (b) in coupling 19 with 20 and 21 with 41; (c) in coupling 19 with 41 and 21 with 22.

Secondly, the brake 2 being tightened and the brake 9 being loosened, one obtains four speeds, two of which running forwardly; (d) in coupling 21 with 22; (e) in coupling 21 with 41, two of which running backwardly; (f) in coupling 19 with 22; and (g) in coupling 19 with 41.

Thirdly, the brake 2 being loosened and 9 being tightened, one obtains four speeds, two of which forwardly; (h) in coupling 19 with 20; (i) in coupling 19 with 41, two of which running backwardly; (j) in coupling 21 with 41; and (k) in coupling 21 with 20.

Or in all 7 speeds running forwardly and 4 speeds running backwardly.

This arrangement has the following advantages:—

Firstly, efficient cooling at the speed most used; and

Secondly, a notable gyroscopic effect at high speed, increasing the stability and the easy riding of the vehicle in the case of a light car.

In order that at high speed, the bevel wheel 18 shall not operate the shaft 14, loosely mounted at that time in its bearings, one can by means of a suitable abutment put the teeth out of gear and thus avoid, if desired, a loss of some kilogrammeters.

It is possible in such device to use any engine of which the elements, cylinders and the like, crank shaft or the like, are differently rendered stationary.

Claims:

1. The combination of a rotary engine having a rotatable crank shaft and cylinders rotatable around such shaft, means whereby to brake the said shaft and the said cylinders separately, two concentric transmission shafts located in the prolongation of the axis of the crank shaft, a differential of which the axis is placed perpendicularly to such shafts, the differential comprising two bevel wheels and bevel pinions fixed on the said transmission shafts and meshing respectively with the bevel wheels and means whereby to couple each of the said transmission shafts alternately with the crank shaft and with the rotary cylinders.

2. The combination of a main frame consisting of a frame, of a tubular prolongation extending outside such frame, and of a casing at the end of such prolongation the said frame having journals located on a line perpendicular to the said tubular prolongation, a rotary engine comprising a crank shaft mounted in such frame on the axis of such tubular prolongation, rotary cylinders mounted on the said frame around the said crank shaft, a differential in such casing, means whereby to stop alternately such shaft and the said cylinder and means whereby to connect operatively the differential alternately with the crank shaft or with the cylinders and with both at the same time.

3. The combination of a rotary engine having a rotatable crank shaft and cylinders rotatable around such shaft, means for braking alternatively the said shaft and the said cylinders, a differential the axis of which is perpendicular to the shaft, the differential comprising two bevel wheels, two concentric transmission shafts located on the prolongation of the crank shaft, two bevel pinions on such transmission shafts and meshing with such wheels respectively, two sleeves having clutch-teeth associated respectively with the crank shaft and with the cylinders, sleeves having clutch-teeth slidable respectively on both said transmission shafts and means whereby to bring the said slidable sleeves in mesh with the first said sleeves, the clutch-teeth of such sleeves being arranged in such a manner that the inner shaft can be coupled alternatively with the crank shaft and with the cylinders, and that the outer shaft can be coupled with the cylinders.

4. The combination of a four cycle rotary engine comprising a rotatable crank shaft, cylinders rotatable around such shaft, a distribution shaft revolving at a speed different from that of the cylinders with regard to the crank shaft, a train of planetary wheels operatively connected with the said distribution shaft, and having a wheel concentric with the crank shaft, a differential, and means whereby to operatively connect such differential alternatively with the said crank shaft or with the said cylinders, or with the said wheel of the planetary train, such means allowing also the connection of the said differential at the same time with both such members, that is to say the crank shaft, the cylinders and wheel, and means to brake alternatively the said crank shaft and the said cylinders.

5. The combination of a rotary engine having a rotary crank shaft and cylinders rotatable around the said shaft, a differential, means whereby to brake alternatively the shaft and the cylinders and means for connecting operatively the differential alternatively with the said shaft and with the said cylinders, such latter means allowing also the connection of the said differential with both the shaft and cylinders.

In testimony that I claim the foregoing as my invention I have signed my name in presence of two subscribing witnesses.

THEODORE LAFITTE.

Witnesses:
 CHAS. P. PRESSLY,
 MAURICE RANE.

Copies of this patent may be obtained for five cents each, by addressing the "Commissioner of Patents, Washington, D. C."